United States Patent [19]

Szippl et al.

[11] 4,408,152

[45] Oct. 4, 1983

[54] SINGLE PHASE, SELF-REGULATED ALTERNATOR

[75] Inventors: Andrew F. Szippl; Robert B. Walker, both of Lima, Ohio

[73] Assignee: The Lima Electric Co., Inc., Lima, Ohio

[21] Appl. No.: 275,968

[22] Filed: Jun. 22, 1981

[51] Int. Cl.$^3$ .......................... H02P 9/10; H02K 19/3
[52] U.S. Cl. ........................................ 322/29; 322/61; 322/62; 322/63; 310/68 D; 310/189
[58] Field of Search ........................ 322/59, 29, 62–67, 322/61, 79; 310/184, 185, 68 D, 189

[56] References Cited

U.S. PATENT DOCUMENTS

| | | | |
|---|---|---|---|
| 3,074,004 | 1/1963 | Schaeffer | 322/64 X |
| 3,160,772 | 12/1964 | Miron | 322/90 X |
| 3,210,644 | 10/1965 | Sparrow | 322/25 |
| 3,238,439 | 3/1966 | Hobbs et al. | 322/63 |
| 4,004,211 | 1/1977 | Takao et al. | 322/63 |

FOREIGN PATENT DOCUMENTS

| | | | |
|---|---|---|---|
| 56-115165 | 9/1981 | Japan | 310/68 D |
| 583516 | 12/1977 | U.S.S.R. | 310/68 D |

*Primary Examiner*—R. J. Hickey
*Attorney, Agent, or Firm*—Maky, Renner, Otto & Boisselle

[57] ABSTRACT

A substantially constant frequency self-regulated generator produces in one embodiment 120 volts or the like single phase output or in another embodiment 120 or 240 volts or the like single phase output. The generator employs an exciter stator and a stationary rectifier assembly with the former being a six pole exciter stator alternately wound with three shunt poles and three series poles with two separate windings on each series pole. The three shunt poles of the exciter stator are connected in series making, in effect, one shunt winding. The series circuit consists of two separate windings on each series pole, which are respectively parallel connected and wound on all three series poles. Each series pole then has two separate isolated coils. With the exciter stator there is employed a stationary diode assembly utilizing three diodes as rectifiers for the shunt and isolated series windings. A further smaller diode in parallel with the shunt winding discharges the stored magnetic field allowing some current flow during the half cycle when the shunt winding is not energized. In addition, a small slide wire resistor may be employed for no-load voltage adjustments.

37 Claims, 5 Drawing Figures

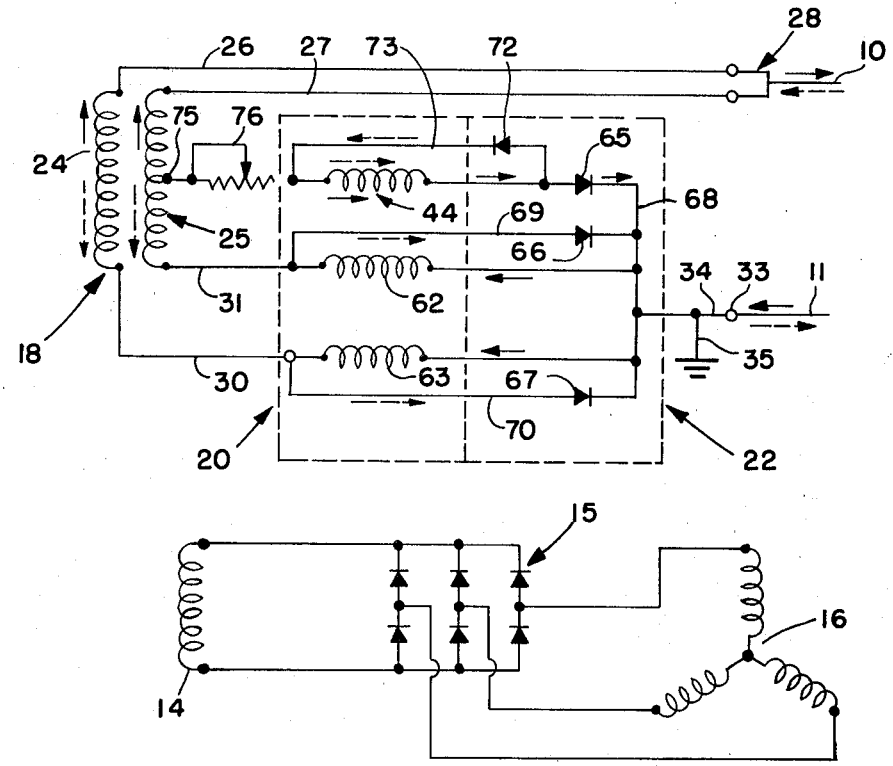
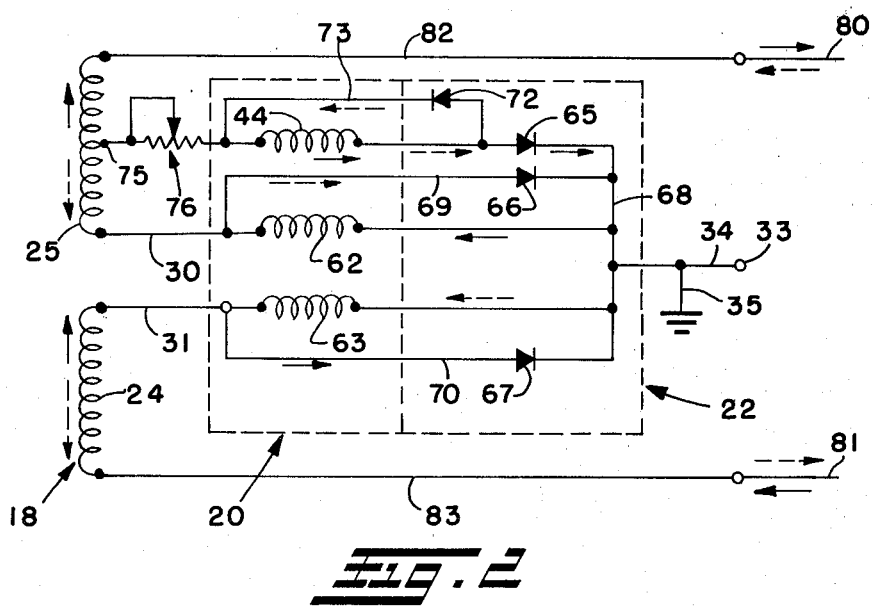

SINGLE PHASE, SELF-REGULATED ALTERNATOR

This invention relates generally as indicated to a constant frequency generator and more particularly to a brushless alternator of the self-regulated type which will produce 120 volt or 120/240 volt single phase output, or the like.

BACKGROUND OF THE INVENTION

This invention relates generally as indicated to certain improvements in brushless alternators of the type shown in Sparrow U.S. Pat. No. 3,210,644.

It is desirable to provide the brushless alternators or generators of the type noted which will produce both 120 or 120/240 volts, single phase output or the like and be self-regulated, that is, not externally regulated. The latter type of output of course employs a neutral connection while the former does not. It is accordingly desirable to provide such generators for both types of connections utilizing common components and not requiring significant wiring changes.

Also, with such output, it is desirable to provide in effect, full excitation when both windings are energized to obtain a relatively high voltage while only half excitation when only one is energized to obtain a relatively lower voltage. Thus, excess excitation and energy requirements should be avoided.

It is also desirable to provide such generator with standard components which may be used with either synchronous externally regulated systems or with self-excited or self-regulated systems. To this end, the generator may employ a standard synchronous externally regulated type rotor assembly utilizing a salient pole main rotor and a three-phase exciter rotor with a rotating rectifier. Also, a standard concentric wound, single phase alternator stator may be employed.

SUMMARY OF THE INVENTION

With the above standard components, a special exciter stator with both shunt and series windings is utilized with a specially designed rotating rectifier assembly. The exciter stator may consist of six salient poles alternately wound with both shunt and series windings. The three shunt poles are connected in series thus making one shunt winding. The series poles alternate with the shunt poles and on each series pole there are two separate isolated coils. The series circuit consists of two separate windings each of such windings being parallel connected and being wound on all three series poles. The exciter stator then is a six pole stator alternately wound with three shunt poles and three series poles with the series poles having the two isolated or separate series windings on each pole.

Utilized with the exciter stator is a stationary rectifier system which is used to provide unidirectional (DC) excitation to the system as is described in greater detail below with respect to the drawings. The stationary rectifier comprises a stationary diode assembly which includes three diodes for the shunt and two series windings all mounted on a common grounded heat sink, and a small lead mounted diode in parallel with the shunt winding. In addition, a small slide wire resistor may be employed for no-load voltage adjustments.

It is accordingly a principle object of the present invention to provide a self-regulated generator which will produce both 120 volts or 120/240 volts single phase output or the like, with optimal excitation.

Another principle object is the provision of such generator which will provide single phase output through a two-wire system or a three-wire system employing a neutral.

A further important object is the provision of such generator utilizing an excitor stator which includes alternately wound shunt and series poles.

Another such object is the provision of such generator and stator wherein the series poles have two separate or isolated windings or coils on each pole.

Yet another important object is the provision of such generator utilizing a special stationary diode assembly in conjunction with the excitor stator to provide unidirectional (DC) excitation for the system.

Yet another object is the provision of such generator and diode assembly, the latter consisting of three diodes mounted on a common grounded heat sink.

Still another object is the provision of such diode assembly wherein two of such diodes are in parallel with the isolated series coils of the excitor stator and the third is in series with the shunt coils.

A yet further object is the provision of such diode assembly including a further small lead mounted diode in parallel with the shunt coil but oppositely directed from the diode in series therewith.

A yet further object is the provision of such generator utilizing a six-pole exciter stator alternately wound with three shunt poles and three series poles with the latter including isolated series windings on each series pole.

Other objects and advantages of the present invention will become apparent as the following description proceeds.

To the accomplishment of the foregoing, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In said annexed drawings

FIG. 1 is a schematic wiring diagram of a generator in accordance with the present invention for use with a 120 volt connection, for example, or with a connection not employing a neutral, such schematic also illustrating the alternator and exciter rotor together with the rotating rectifier;

FIG. 2 is a similar schematic for a 120/240 volt or similar connection utilizing a neutral;

DESCRIPTION OF THE PREFERRED EMBODIMENTS

Referring first to FIG. 1, there is illustrated a schematic wiring diagram for a generator in accordance with the present invention providing a 120 volt single phase output, for example, between two lines seen at 10 and 11. Also illustrated in FIG. 1 is the wiring diagram for the alternator rotor, the rotating rectifier and the exciter rotor as seen at 14, 15, and 16, respectively, which may be driven by a prime mover such as a diesel engine, not shown. The rotor assembly illustrated at 14, 15, and 16 may be a standard synchronous externally regulated system consisting of a salient pole main rotor and a three-phase exciter rotor.

In addition, the generator includes a standard concentric wound, single phase alternator stator shown generally at 18, an exciter stator shown at 20, and a stationary rectifier or diode assembly shown at 22.

The alternator stator includes coils 24 and 25 with one end of each coil being connected to lines 26 and 27, respectively to the power line 10 through the connection 28. The opposite end of each coil is connected through lines 30 and 31 to the exciter stator 20. The opposite line 11 of the single phase output is connected at 33 to line 34 leading to the rectifier or diode assembly 22. Such line is grounded as indicated at 35.

Figure 3:
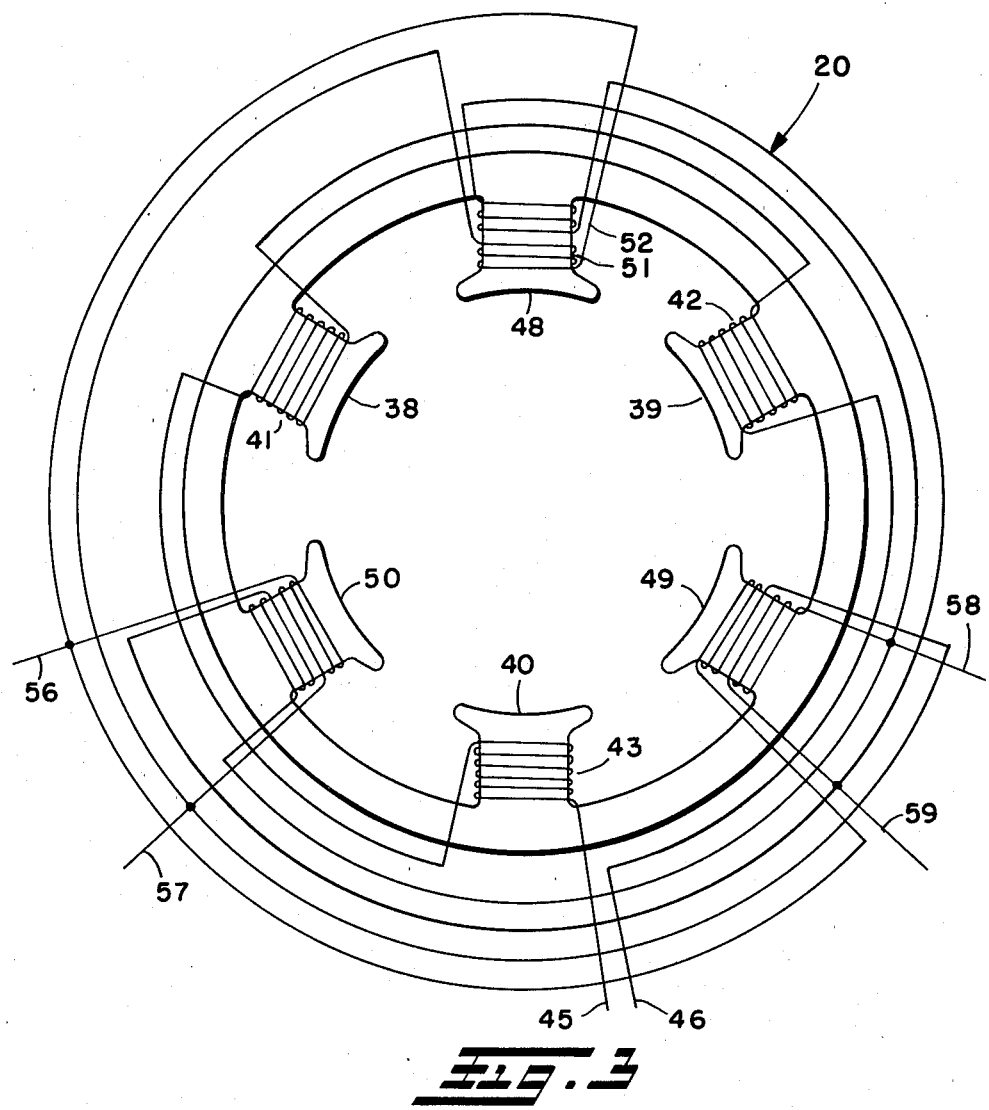
FIG. 3 is an axial schematic elevation of the exciter stator showing the six lead connections for the shunt and dual series pole windings.
Figure 4:
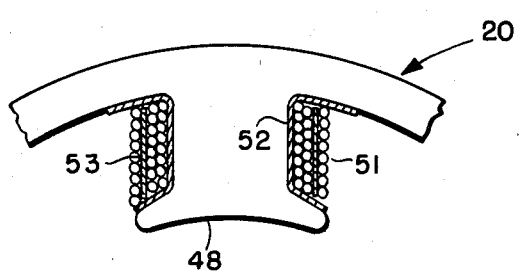
FIG. 4 is a transverse section through a series winding showing the top and bottom winding therefor.
Figure 5:
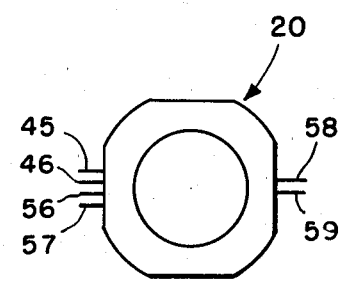
FIG. 5 is a small scale axial schematic of the exciter stator showing the lead collections on opposite sides.

Digressing momentarily to FIGS. 3, 4 and 5, it will be seen that the exciter stator 20 consists of six poles with poles 38, 39 and 40 being provided with shunt windings seen at 41, 42 and 43, respectively, which are collectively identified at 44 in FIG. 1. Each shunt winding is connected in series with the lead for the shunt windings exiting the stator as seen at 45 and 46.

The alternate poles of the stator seen at 48, 49 and 50 are each provided with two separate windings as seen at 51 and 52 which may be termed top and bottom coils. Such coils are electrically isolated from each other as indicated at 53 in FIG. 4. Each of the three top coils are parallel connected with the leads exiting the stator as seen at 58 and 59, and collected on the opposite side of the stator from the leads 45, 46, 56 and 57 as seen in FIG. 5. The three bottom windings on the alternate series poles are shown collectively at 62 in FIG. 1 while the three top windings are shown collectively at 63.

The stationary diode or rectifier assembly consists of three press-in diodes seen at 65, 66 and 67 all mounted on a common ground heat sink and connected to line 68 which is connected as indicated to grounded line 34.

As illustrated in FIG. 1, the diodes 66 and 67 are in circuits 69 and 70, respectively, parallel with the windings 62 and 63, respectively. The diode 65 is in series with the shunt winding 44 and an oppositely directed diode 72 is in circuit 73 parallel to shunt winding 44 but in series with diode 65.

The shunt windings 44 are connected to a tap 75 on the alternator stator and a small slide wire resistor may be employed between the tap and the shunt winding as seen at 76.

Referring now to the three-wire system of FIG. 2 for the 120/240 volt connection, it will be seen that the alternator stator, exciter stator, and diode assembly are the same. The rotor assembly is, of course, the same. The only difference is in the connection of the two power lines 80 and 81 to the windings 24 and 25 of the single phase alternator stator. The line 80 may be connected directly to the winding 25 through line 82 while the line 81 may be connected directly to the winding 24 through line 83. For illustrative and comparative purposes only, the voltage between the lines 10 and 11 may be 120 volts. The voltage between line 80 and the grounded line or neutral 34 may be 120 volts. The same voltage would exist between the lines 81 and 34 and between lines 80 and 81 there would be 240 volts.

The wiring connections and components are otherwise the same.

Operation

For ease of illustration, in the schematic diagram, solid arrows are employed to illustrate current flow during one-half cycle while dotted arrows illustrate current flow during the other half cycle.

Referring first to the shunt circuit, it will be noted that the shunt circuit provides excitation for no load. Voltage for the shunt is obtained from the tap 75 on the alternator stator at approximately 60 volts. With current flowing in the alternator stator in the direction shown by the solid arrows, the current flow is through the voltage adjust resistor 76, shunt winding 44, and then through diode 65 back through winding 62 to line 31, as is shown by the solid arrows in the drawings. In the other half cycle, current flow from the alternator is blocked by the diode 65. However, the magnetic field stored in the shunt winding 44 is now discharged through "free-wheeling diode" 72 allowing some shunt current flow through this half cycle. During such other half cycle the shunt current passes through the shunt winding 44 and then back through the free-wheeling diode 72 through the parallel circuit 73.

The tap voltage from the alternator stator normally provides more excitation than is required to obtain rated output voltage and the voltage adjust resistor 76 may be set to provide the desired no-load voltage. The voltage adjust resistor has minimal effect on full load output voltage and may optionally be omitted.

Series Circuit—120/240 Volt Connection

Referring first to FIG. 2, when a load is applied to the lines 80 and 81, the load current flows through the series winding and the stationary diode assembly. During the half cycle shown by the solid arrows, current from the alternator stator coil 24 flows through parallel circuit and diode 67 then through the other series winding 62, the alternator stator winding 25 and out line 80 to load. During the other half cycle current flows in the direction of the dotted arrows from the stator coil 25 through parallel circuit 69 and diode 66, then the series winding 63, the alternator winding 24 and out line 81 to load.

For the half cycle that a series winding is not conducting, the bypass diodes 66 or 67 also act as "freewheeling diodes" providing some additional exciter output. The two series windings thus conduct alternately each half cycle and being wound on a common pole give, in effect, full wave excitation.

Series Circuit—120 Volt Connection

With reference to FIG. 1, during one half cycle current flows in the direction of the solid arrows with the current from line 11 passing through both series windings 62 and 63 and through the alternator stator windings 24 and 25 through lines 26 and 27 out line 10 to load. The tap 75 permits current flow through the shunt winding 44 and then through diode 65 back to neutral, under no-load conditions.

During the other half cycle, current flows from the line 10 through the lines 26 and 27 and through the alternator stator windings 24 and 25 and then through the parallel circuits 69 and 70 through the diodes 66 and 67. Also, during such half cycle, current bypasses both series windings 62 and 63 flowing through diodes 66 and 67. During such other half cycle, when in a no-load condition, current flow from the alternator is blocked by the diode 65 but the magnetic field stored in the shunt winding is discharged through the free-wheeling diode 72 allowing some shunt current flow during such half cycle. This provides more shunt output than would be obtained from a half-wave operation only.

With respect to FIG. 2, when loading either 120 volt side separately, the alternator performs as in connection with FIG. 1, providing in effect half excitation in the series windings. This half-wave excitation in the series windings provides sufficient excitation since the alternator is only half loaded.

It can now be seen that there is provided a generator producing both 120 volt or 120/240 volt single phase output, for example, which is self-regulated. The generator includes an exciter stator with both shunt and series wound poles which are excited unidirectionally, as shown in the drawings, for example, by a stationary rectifier assembly providing, in effect, full excitation magnitude at 240 volts, or half-wave excitation when loading either 120 volt side separately or in a parallel 120 volt connection.

We claim:

1. A generator for producing a higher or lower voltage output comprising an alternator stator, an exciter stator, said exciter stator including two series windings, and means to energize both series windings every other half cycle at the lower voltage output and alternate series windings during every half cycle at the higher voltage output.

2. A generator as set forth in claim 1 wherein said means includes a stationary diode assembly operative to energize the series windings as aforesaid.

3. A generator as set forth in claim 2 including a diode for each series winding operative to direct current flow through either or both series windings depending on the winding interconnections.

4. A generator as set forth in claim 3 wherein the diode for each series winding is in parallel therewith and operates in the freewheeling mode.

5. A generator as set forth in claim 4 including a shunt winding, and a diode in series therewith.

6. A generator as set forth in claim 5 including an oppositely directed diode parallel with the shunt winding and operating in the freewheeling mode.

7. A generator as set forth in claim 6 including a tap on the alternator stator operative to energize the shunt winding at no load.

8. A generator as set forth in claim 7 including a voltage adjust resistor between said tap and shunt winding.

9. A generator as set forth in claim 1 wherein said exciter stator is a multi-pole stator with said two series windings being isolated windings on alternate poles.

10. A generator as set forth in claim 9 including a series connected shunt winding on alternate poles on said exciter stator.

11. A generator as set forth in claim 10 including a diode in parallel with said shunt winding operative to discharge the magnetic field stored therein.

12. A generator as set forth in claim 11 including a diode in series with said shunt winding operative to provide current flow therethrough under no-load conditions.

13. A generator as set forth in claim 12 including a tap on said alternator stator to provide current to said shunt winding.

14. A generator as set forth in claim 13 including a voltage adjust resistor between said top and shunt winding.

15. A generator as set forth in claim 1 wherein said exciter stator includes multiple poles, every other pole including said two series windings.

16. A generator as set forth in claim 15 wherein said stator includes 6 poles, alternate poles being each wound with said two series windings.

17. A generator as set forth in claim 16 wherein each of said two series windings are isolated on each pole and series connected.

18. A generator as set forth in claim 16 wherein every other pole includes a shunt winding.

19. A generator as set forth in claim 18 wherein said shunt windings are series connected to form a single shunt winding.

20. In a generator of the substantially constant frequency type having an alternator rotor and stator, a corresponding exciter rotor and stator, and operable in two modes, the improvement comprising a multi-pole exciter stator having alternate series and shunt poles, each series pole having two separate windings, and means for using said two separate windings, alternately during each half cycle of one mode of operation and for using said two separate windings concurrently during every other half cycle of the other mode of operation.

21. A generator as set forth in claim 20 wherein said two separate windings on each series pole are connected in parallel to form such two separate series windings.

22. A generator as set forth in claim 21 including a diode in parallel with each separate series winding.

23. A generator as set forth in claim 20 wherein said exciter stator has 6 poles with every other pole including said two separate windings.

24. A generator as set forth in claim 23 wherein every other pole includes a shunt winding.

25. A generator as set forth in claim 24 wherein said shunt windings are series connected to form a single shunt winding.

26. A generator as set forth in claim 25 including a diode in series with said shunt winding operative to provide current flow therethrough under no-load conditions.

27. A generator as set forth in claim 26 including a diode in parallel with said shunt winding operative to discharge the magnetic field stored therein.

28. A generator as set forth in claim 27 including a tap on said alternator stator to provide current to said shunt winding.

29. A generator as set forth in claim 28 including a voltage adjust resistor between said tap and shunt winding.

30. In a generator of the substantially constant frequency type having an alternator rotor and stator, and a corresponding exciter rotor and stator, the exciter stator having at least two separate series windings, and operable in two modes, the improvement comprising a stationary diode assembly including circuit means having control diodes for each winding operative to energize said windings alternately during each half cycle of one mode of operation and concurrently during every other half cycle of the other mode of operation.

31. A generator as set forth in claim 30 including a shunt winding in said exciter stator and a shunt control diode in said assembly operative to energize said shunt winding under no-load conditions.

32. A generator as set forth in claim 31 wherein said diode assembly includes a further diode parallel with said shunt winding but oppositely directed and in series with said shunt control diode.

33. A generator as set forth in claim 30 wherein said two modes of operation have different output voltages and said windings are energized alternately during each half cycle when the generator is operated in the higher voltage output mode of operation.

34. A generator as set forth in claim 33 wherein said circuit means includes means for energizing one of said two separate series windings during alternate half cycles and the other of said two separate series windings during the remaining half cycles to provide, in effect, full wave excitation at such higher voltage mode of operation.

35. A generator as set forth in claim 33 wherein said higher voltage output is 240 volts.

36. A generator as set forth in claim 30 wherein said windings are energized concurrently during every other half cycle when the generator is operated in the lower voltage output mode of operation.

37. A generator as set forth in claim 36 wherein said lower voltage output is 120 volts.

* * * * *